(12) United States Patent
Oh et al.

(10) Patent No.: US 6,661,399 B1
(45) Date of Patent: Dec. 9, 2003

(54) LIQUID CRYSTAL DISPLAY DEVICE HAVING A DIGITIZER

(75) Inventors: Young-Jin Oh, Kyonggi-do (KR); Yun-Cheol Jeong, Seoul (KR); Young-Soo Ahn, Anyang (KR)

(73) Assignee: LG.Philips LCD Co., Ltd., Seoul (KR)

( * ) Notice: Subject to any disclaimer, the term of this patent is extended or adjusted under 35 U.S.C. 154(b) by 334 days.

(21) Appl. No.: 09/598,606

(22) Filed: Jun. 21, 2000

(30) Foreign Application Priority Data

Jun. 21, 1999 (KR) .......................................... 1999-23168

(51) Int. Cl.[7] .............................. G09G 3/36; G09G 5/00
(52) U.S. Cl. ......................................... 345/87; 345/174
(58) Field of Search ................................. 345/173, 905, 345/87, 174, 175, 176, 177; 178/18.01, 18.11, 21.01, 18.03, 18.04, 18.05, 18.06, 18.07

(56) References Cited

U.S. PATENT DOCUMENTS

| | | | | |
|---|---|---|---|---|
| 5,657,054 A | * | 8/1997 | Files et al. | .................. 345/177 |
| 5,677,711 A | * | 10/1997 | Kuo | ............................ 345/173 |
| 5,764,216 A | * | 6/1998 | Tanaka et al. | ............... 345/147 |
| 6,239,788 B1 | * | 5/2001 | Nohno et al. | ................ 345/173 |

* cited by examiner

*Primary Examiner*—Vijay Shankar
(74) *Attorney, Agent, or Firm*—McKenna Long & Aldridge LLP

(57) ABSTRACT

A liquid crystal display (LCD) device having a digitizer. A liquid crystal panel is supported by a lower frame having a side wall portion. A digitizer is located on the liquid crystal panel. An upper frame having a front surface with an opening region and a side wall portion is located over the digitizer such that the tipper frame pressurizes a peripheral portion of the digitizer. The opening region is formed at a location corresponding to the display region of the liquid crystal panel. The upper and lower frames mate to hold the liquid crystal panel and the digitizer in place. The upper frame is beneficially metallic to provide electrical shielding of conductors on the digitizer. Common electrical circuits are shared by the digitizer and the liquid crystal panel.

22 Claims, 7 Drawing Sheets

LIQUID CRYSTAL DISPLAY DEVICE HAVING A DIGITIZER

CROSS REFERENCE

This application claims the benefit of Korean Patent Application No. 1999-23168, filed on Jun. 21, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a liquid crystal display device having a digitizer.

2. Description of Related Art

Liquid crystal display (LCD) panels are used in many electronic data handling devices, including lap-top computers, personal digital assistants, personal organizers, and point-of-sale terminals. Some display systems include the ability of inputting information directly onto the display screen by pointing or writing with a finger or a stylus. For example, a finger may be used to push a "soft" button that is displayed on the screen, or a stylus can be used to sign one's name and have it captured and displayed electronically.

An LCD panel, shown in FIG. 1, comprises a liquid crystal display (LCD) module "L" and a digitizer "D". The LCD module "L" has lower and upper substrates 10 and 20 with an interposed liquid crystal layer 13. The lower substrate 10 has switching elements (not shown), such as thin film transistors (TFTs), and the upper substrate 20 has a common electrode, a color filter and a black matrix. A linear polarizer 22 is located on the upper substrate. The lower and upper substrates 10 and 20 are sealed by a sealant 12 to prevent leakage of the liquid crystal. Further, pads (not shown) patterned on the lower substrate 10 are electrically coupled to a printed circuit board (PCB) 14 through a TCP (tape carrier package) 17 having a film 18 carrying a drive integrated circuit (IC) 19. Pads (not shown) on the lower substrate 10 and output signal lines of the film 18 are electrically connected with an anisotropic conductive film 16a, and signal lines of the PCB 14 and input lines of the film18 are electrically connected with an anisotropic conductive film 16b.

Furthermore, the digitizer "D" is a location-sensing component having first and second plates 24 and 26, and a drive circuit 25 (see FIG. 4). The plates 24 and 26 serve to produce or detect signals indicative of the location of a stylus, a finger, or another input device. Each of the plates 24 and 26 has a substrate, a transparent electrode, and a metal pattern layer that are stacked in that order. Further, as shown in FIG. 2, which is a plan view of the first plate 24 of the digitizer "D", the first plate 24 has a plurality of regularly spaced digitizer electrodes 28 formed along the edges of an active region 32. The digitizer electrodes 28 are connected to an external digitizer drive circuit (not shown). The active region 32 is a location sensing region having a resistive layer in the form of a strip or a grid.

Further, the drive circuit 15 for the LCD module "L" shown in FIG. 3 comprises a power supply 15a for supplying a voltage, a clock generator 15b for producing clock signals to drive the LCD device, a gamma circuit 15c for collecting a gamma characteristic of the LCD device, a controller 15d for controlling all components of the LCD module "L", and data and gate drivers 15e and 15f for producing images. Further, the drive circuit 25 for the digitizer "D" shown in FIG. 4 comprises a power supply 25a for supplying a voltage, a clock generator 25b for producing clock signals to drive the digitizer, a controller 25c for controlling all components of the digitizer "D", an analog to digital (A/D) converter 25d for converting analog signals to digital signals, an input/output (I/O) unit 1 25e for conveying analog signals from the digitizer to the A/D converter 25f and conveying signals from the controller 25d to the digitizer, and an input/output (I/O) unit 2 25f for transferring digital signals in the form of x and y coordinate values from the AID converter 25d to a main system of the device having the LCD device such as notebook computer by the controller 25c.

However, the LCD panel described above has disadvantages. First, as shown in FIG. 2, since a plurality of wires 30 are directed along one direction for connection with the external drive circuit 25, the wires 30 differ in length, thereby causing different RC delays. Second, as shown in FIGS. 3 and 4, the digitizer "D" and the liquid crystal display module "L" use different drive circuits 15 and 25 even though they have some similar elements, such as a power supply, a controller and a clock generator. Multiple similar elements increase the production cost of an LCD device with a digitizer. Furthermore, multiple similar elements make it difficult to achieve a compact LCD panel.

SUMMARY OF THE INVENTION

To overcome the problems described above, preferred embodiments of the present invention provide a liquid crystal display (LCD) device having a digitizer in which the drive circuit for the digitizer is integrated with the drive circuit for the LCD device.

Another object of the present invention is to provide a compact LCD device.

Another object of the present invention is to provide a low cost LCD device.

To achieve the above objects, the present invention provides a liquid crystal display device having a digitizer, including: a first frame; a liquid crystal panel supported by the first frame, the liquid crystal panel having a display region and a side wall portion; a digitizer located on the liquid crystal panel, the digitizer having a peripheral portion; and a second frame having a front surface with an opening region and a side wall portion, the front surface pressurizing the peripheral portion of the digitizer, and the opening region formed at a location corresponding to the display region of the liquid crystal panel.

The liquid crystal display device of the present invention further includes a printed circuit board having a drive circuit for driving the digitizer; and a first connection electrically connecting the printed circuit board with the digitizer, with the first connection passing between the side wall portion of the liquid crystal panel and the side wall portion of the second frame.

The liquid crystal display device further includes a printed circuit board located on a back surface of the first frame, the printed circuit board having a controlling circuit for controlling both the liquid crystal panel and the digitizer.

The digitizer includes a plurality of digitizer electrodes covered by the front surface.

The present invention also provides a liquid crystal display device used by a main system, including: a digitizer for producing signals indicative of the location of an external input and driven according to a first clock generated by a first clock generator; a liquid crystal display device for displaying predetermined information according to signals from the digitizer, the liquid crystal display device having first and second substrates with an interposed liquid crystal layer, and data and gate lines; and a printed circuit board having a controlling circuit for controlling the digitizer and the liquid crystal display.

The drive circuit includes a power supply for supplying a voltage to the LCD panel and the digitizer; a clock generator for producing clock signals to drive the LCD device and the digitizer; an analog to digital (A/D) converter for converting analog signals to digital signals; a gamma circuit for correcting gamma characteristics of the LCD device; a first input/output (I/O) unit for conveying analog signals to the A/D converter and conveying signals from the controller to the digitizer; a second input/output (I/O) unit for transferring digital signals in the form of x-y coordinate values from the AID converter to the main system; data and gate drivers driven by the clock generator; and a controller for controlling all components of the drive circuit.

The first I/O unit is beneficially a serial port, a parallel port, a universal serial bus (USB), or an IEEE 1394 bus.

The digitizer includes a) a first digitizer substrate having a rectangular shape over the tipper substrate of the liquid crystal display device; b) a second digitizer substrate having a rectangular shape over the first digitizer substrate; c) a protective layer on the second digitizer substrate, d) a first pair of digitizer electrodes disposed parallel to each other and along opposite edges of the first digitizer substrate; d) a second pair of digitizer electrodes disposed parallel to each other and along opposite edges of the second digitizer substrate, the second pair of digitizer electrodes being perpendicular to the first pair of digitizer electrodes, e) first and second drive circuit boards for driving the first and second pairs of digitizer electrodes, each drive board disposed along neighbering edges of the first and second transparent conductive layers, and f) electric connections for connecting the first and second drive circuit boards to a corresponding pair of digitizer electrodes, with the electric connections having the same length.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiments of the present invention, examples of which are illustrated in the accompanying drawings.

Figure 1:
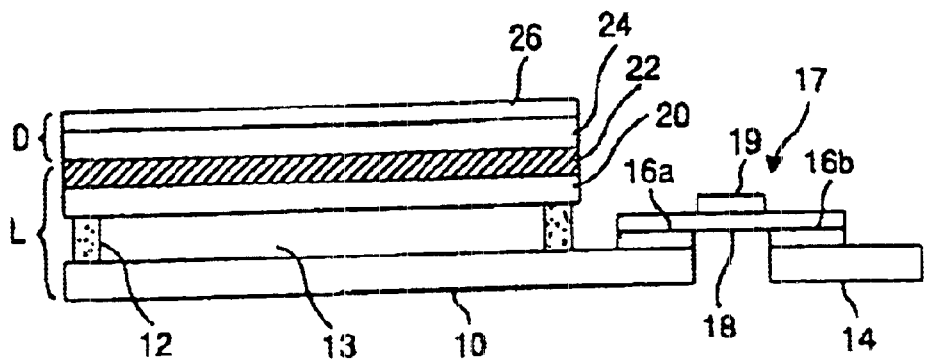
FIG. 1 is a schematic sectional view showing a LCD device having a digitizer according to a related art.
Figure 2:
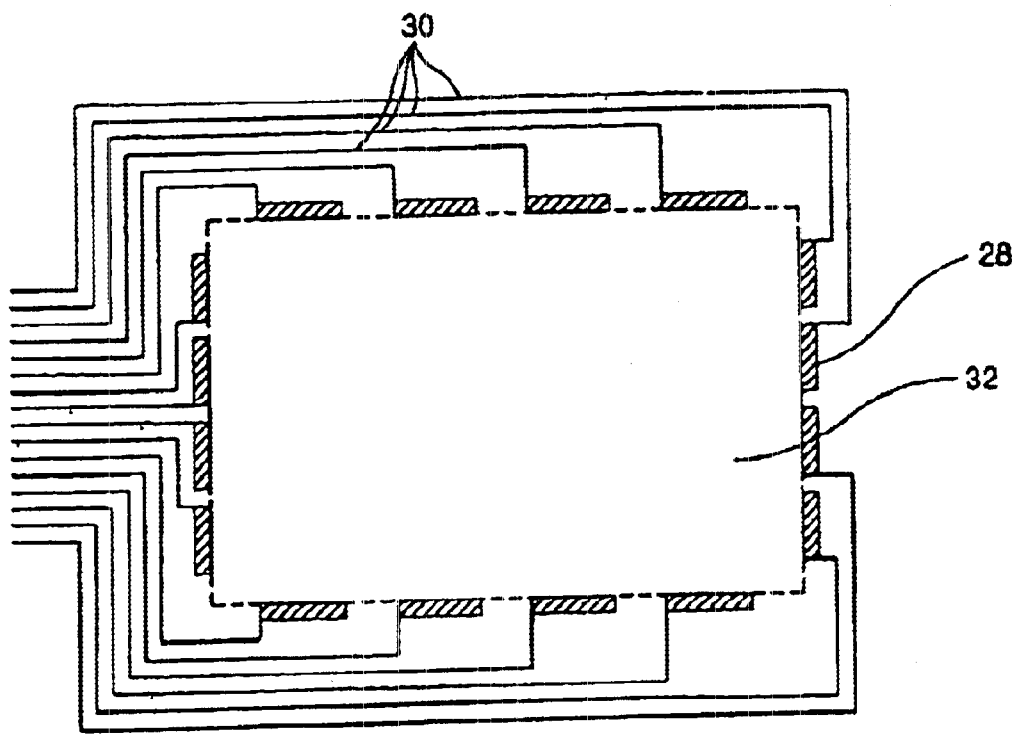
FIG. 2 is a plan view of a lower plate of the digitizer of FIG. 1.
Figure 3:
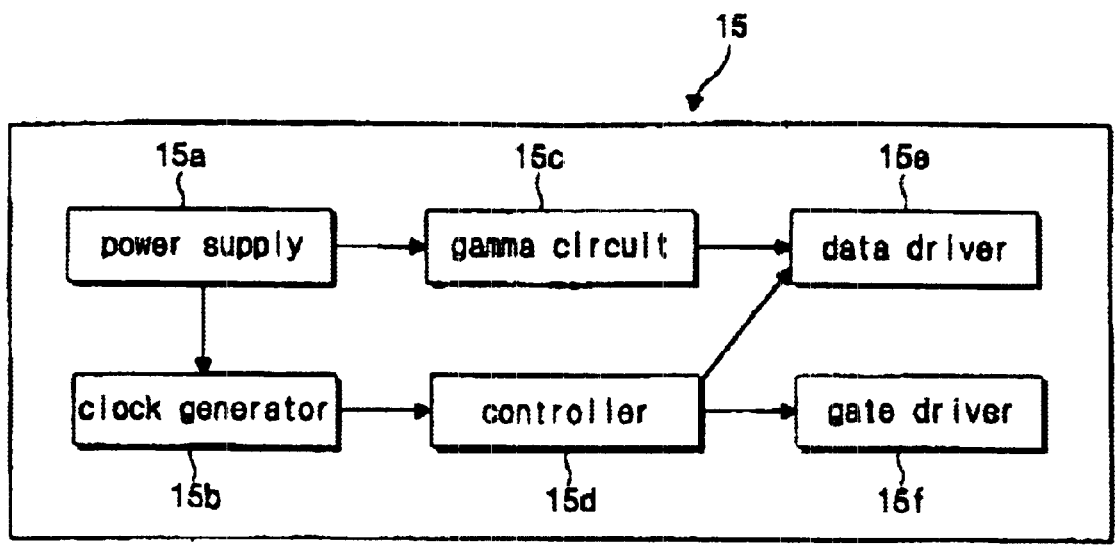
FIG. 3 is a block diagram of a drive circuit of the LCD device of FIG. 1.
Figure 4:
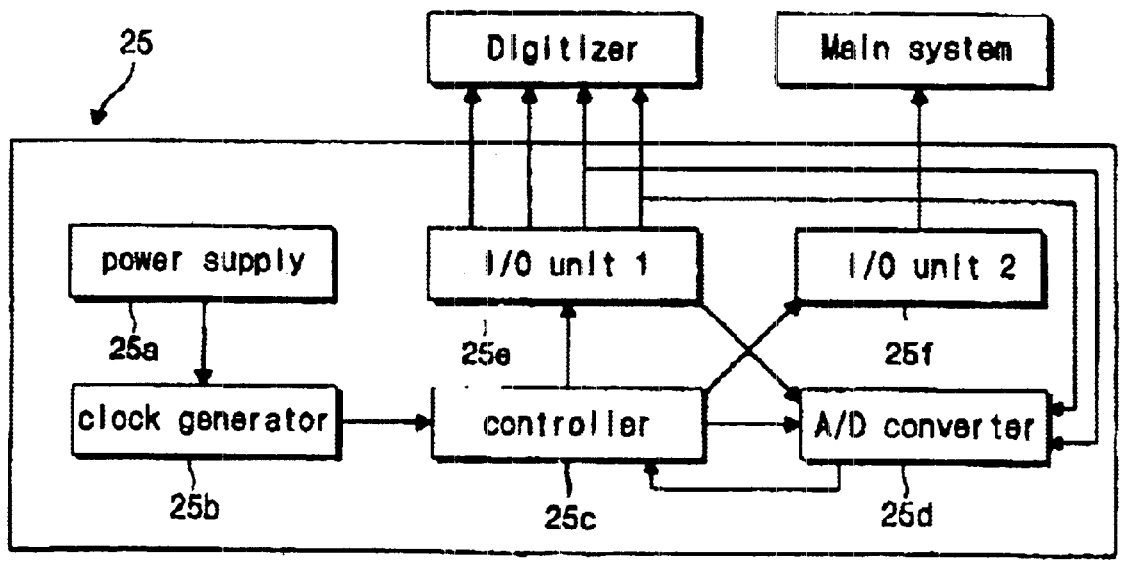
FIG. 4 is a block diagram of a drive circuit of the digitizer of FIG. 1.
Figure 5A:
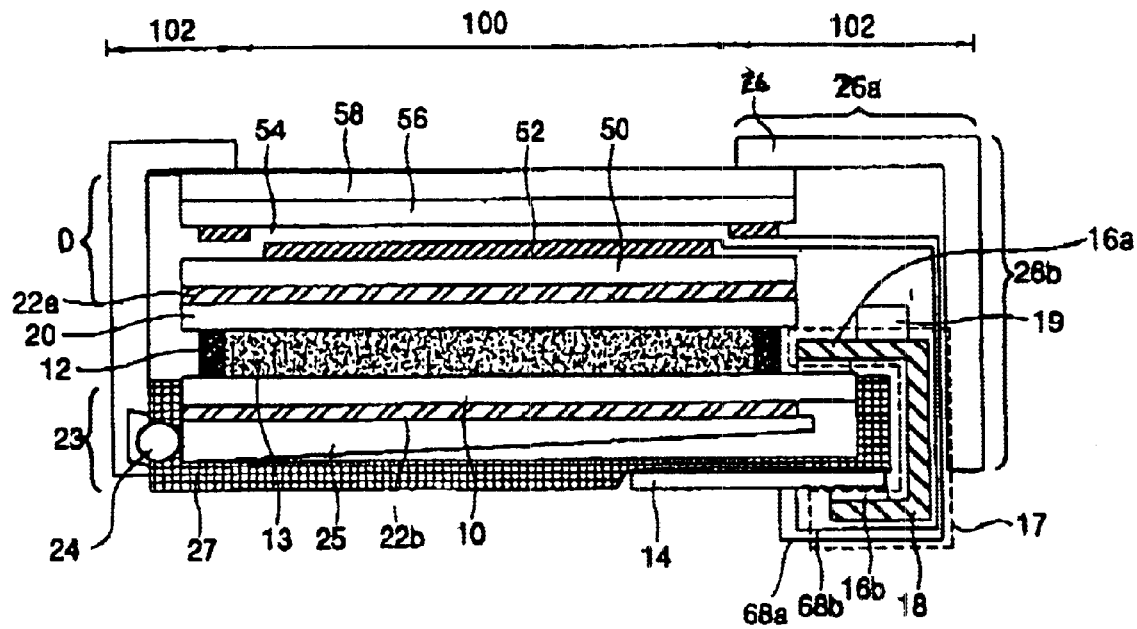
FIG. 5A is a schematic cross-sectional view showing a LCD device having a resistive type digitizer according to a first embodiment of the invention.

FIG. 5A is a schematic cross-sectional view illustrating a liquid crystal display (LCD) device having a resistive digitizer according to a first embodiment of the present invention. As shown in FIG. 5A, the inventive LCD device having a resistive digitizer comprises a liquid crystal panel and the resistive type digitizer "D". The liquid crystal panel includes lower and upper substrates 10 and 20 having an interposed liquid crystal layer 13. The lower substrate 10 has switching elements (not shown) such as thin film transistors (TFTs), and the upper substrate has a black matrix and color filters (not shown). Further, upper and lower polarizers 22a and 22b are located on the upper and lower substrates 10 and 20, respectively. The lower and upper substrates 10 and 20 are sealed by a sealant 12, thus preventing leakage of the liquid crystal. The liquid crystal panel further includes a back light device 23 having a lamp 24 and a light wave-guide plate 25. The LCD device having a resistive type digitizer further includes first and second frames 26 and 27. The first frame 26 has substantially a rectangular shape and an opening portion corresponding to the display region 100 of the LCD device. The first frame 26 has a front surface and a side wall portion (26b). The front surface includes an opening portion and a front peripheral surface portion (26a) around the opening portion. he side wall portion (26b) is perpendicular to the front surface. The front peripheral surface portion (26a) overlaps a non-display region 102 of the LCD device sufficiently to pressurize the digitizer "D", and covers the digitizer electrodes that are formed on the peripheral region of the digitizer (see below). By covering the digitizer electrodes with the first frame, noise can be reduced. The second frame 27 serves to Support the liquid crystal panel. Thus, the liquid crystal panel and the digitizer "D" are held by the first and second frames 26 and 27 when assembled. The first frame 26 is made of a metal, while the second frame 27 is plastic.

A printed circuit board (PCB) 14 is located on the rear surface of the second frame 27. The pads (not shown) of the lower substrate are connected with the printed circuit board (PCB) 14 through a TCP 17 having a film 18 where a drive integrated circuit (IC) chip 19 is mounted. Between the lower substrate 10 and the film18 is an anisotropic conductive film 16a and between the PCB 14 and the film18 is an anisotropic conductive film 16b. The PCB 14 includes a gate PCB 60 (see FIG. 7) and a data PCB 62 (see FIG. 7) which are respectively connected to the data or gate pads (not shown) patterned on the lower substrate through a gate TCP 64 (see FIG. 7) and a data TCP 66 (see FIG. 7). The first and second polarizers 22a and 22b are located on the upper substrate 20 and the lower substrate 10 respectively.

Furthermore, the digitizer "D" has first and second digitizer substrates 50 and 56, and a protective layer 58, which are stacked in that order. The first digitizer substrate 50 has a digitizer pattern on its front surface 50a, and the second digitizer substrate 56 also has a digitizer pattern on its bottom surface 56a. The digitizer patterns may have a grid shape, a strip shape or a rectangular shape. In the case of a rectangular shaped conductive layer, it is preferred that the conductive layer is transparent.

Figure 6A:
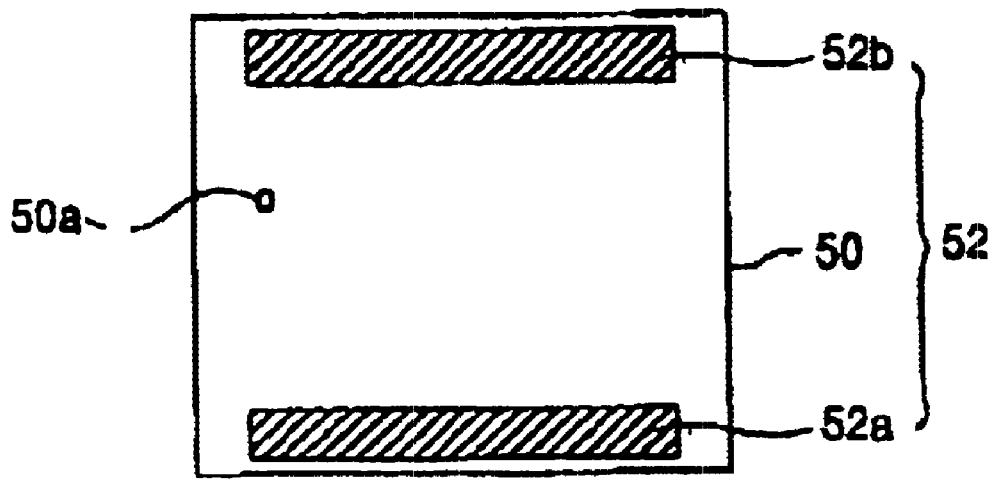
FIGS. 6A and 6B are plan views illustrating arrangements of digitizer electrodes of the resistive type digitizer according to the first embodiment of the present invention.
Figure 6B:
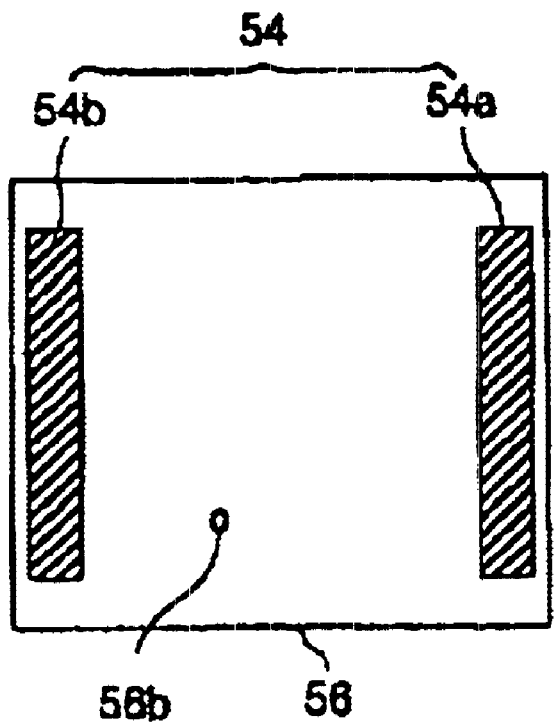

Referring to FIGS. 6A and 6B, the first digitizer substrate 50 preferably has a first pair of digitizer electrodes 52a and 52b arranged on its front surface and spaced apart from each other, and the second digitizer substrate 56 preferably has a second pair of digitizer electrodes 54a and 54b arranged on its bottom surface and spaced apart from each other. Each of the first pair of digitizer electrodes 52 (52a and 52b) has a bar shape and are arranged in a transverse direction, while each of the second pair of digitizer electrodes 54 (54a and 54b) also has a bar shape and are arranged in a longitudinal direction perpendicular to the first pair of digitizer electrode 52 so that the pairs of digitizer electrodes 52 and 54 substantially form a rectangle when the first and second pairs of digitizer substrates 50 and 56 are aligned. The first and second pairs of digitizer electrodes 52 and 54 are electrically connected to the corresponding digitizer pattern. The resistance of the digitizer electrodes 52 and 54 is lower than that of the digitizer pattern.

Figure 7:
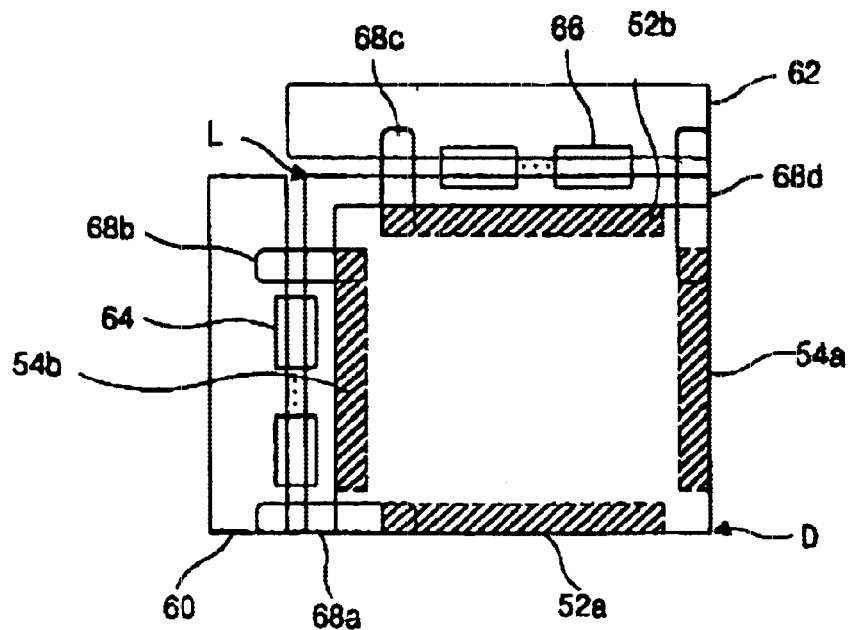
FIG. 7 is plan views of the LCD device having a resistive type digitizer.

FIG. 7 shows the LCD device when the first and second digitizer substrates 50 and 56 are aligned. The digitizer "D" is arranged over the upper substrate 22 of the LCD panel, and the digitizer electrodes are electrically connected with a digitizer drive circuit (not shown). The digitizer drive circuit is mounted on a gate and/or a data PCB 60 and 62. The first digitizer electrode 52a and the second digitizer electrode 54b are connected with the digitizer drive circuit on the gate PCB 60 through first and second connections 68a and 68b respectively. The first digitizer electrode 52b and the second digitizer electrode 54a are electrically connected with the digitizer drive circuit on the data PCB 62 through third and fourth connections 68c and 68d respectively. All connections 68a, 68b, 68c and 68d are the same length, thereby preventing different RC delay. As a result, the LCD drive circuit and the digitizer drive circuit can use the same PCBs 60 and 62, leading to a low-cost and compact LCD device.

The first to fourth connections 68a, 68b, 68c and 68d are preferably made of a flexible printed cable (FPC). Alternatively, the gate and data PCBs 60 and 62 can be connected with the four digitizer electrodes directly using a wire-bondinig method or a soldering method. The connections 68a, 68b, 68c and 68d, are beneficially covered by the first frame 26, which is made of metal (see FIGS. 5A and 5B). That is, the connections are electrically shielded by the first frame. Therefore, electrical signals at the connections are not affected by electromagnetic interference or external electrical noise. The connections 68a, 68b, 68c and 68d are also protected from physical impacts, thereby enabling a long life.

Figure 5B:
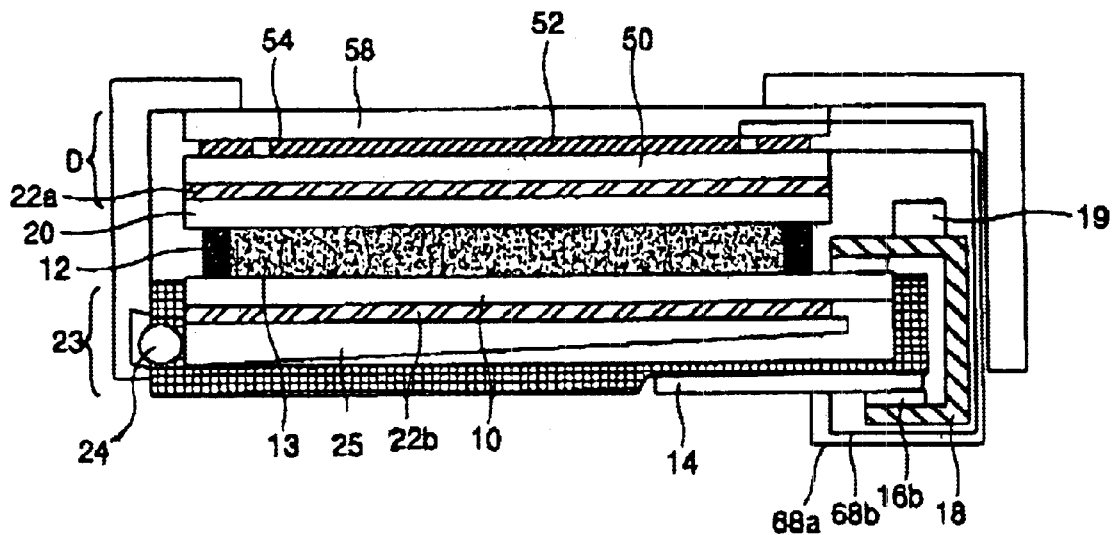
FIG. 5B is a schematic cross-sectional view showing a LCD device having a coupling capacitive type digitizer according to a second embodiment of the invention.
Figure 8:
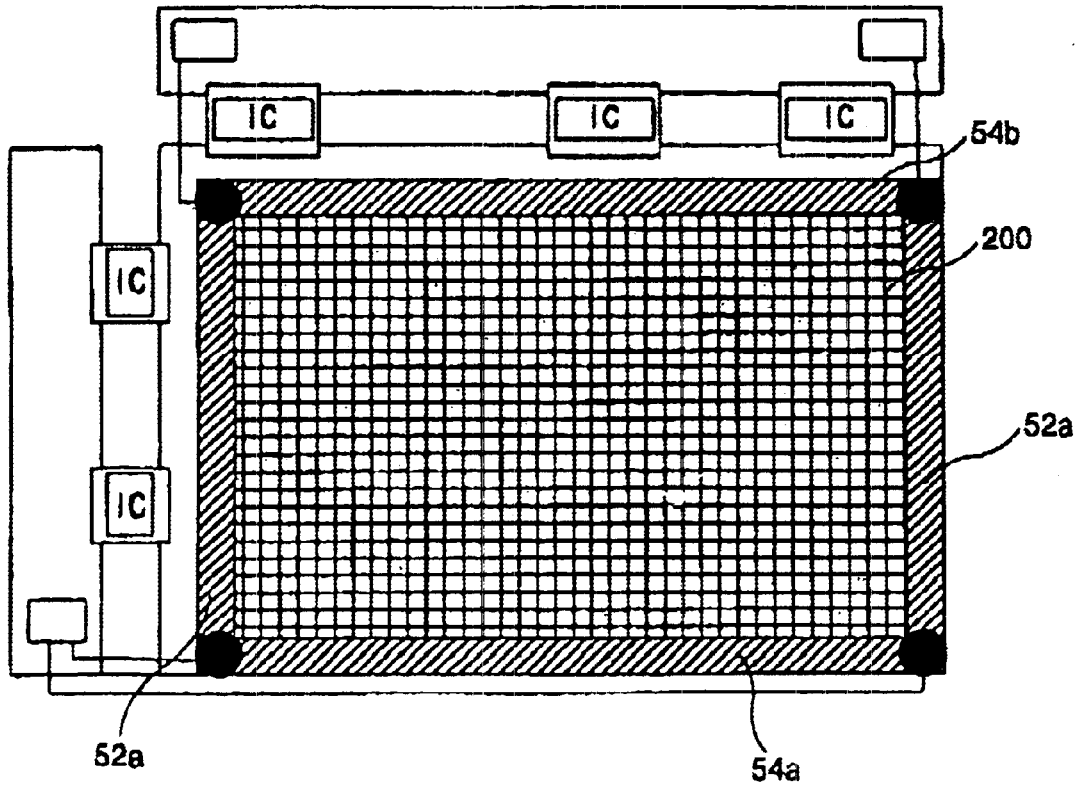
FIG. 8 is plan views of the LCD device having a coupling capacitive type digitizer.

FIGS. 5B and 8 show a LCD device having a coupling capacitive type digitizer according to the second embodiment of the present invention. As shown, a digitizer pattern 200 and first and second pairs of digitizer electrodes 52 and 54 are arranged on the same substrate, i.e., a digitizer substrate 52. The digitizer pattern 200 may have a grid shape, a strip shape, or a large rectangular shape of higher resistance than the digitizer electrodes. As with the first embodiment, the front peripheral surface portion overlaps a non-display region of the LCD device sufficiently to pressurize the digitizer "D". The front peripheral surface portion also covers the digitizer electrodes, which are formed on the peripheral regions of the digitizer so as to enable the use of the whole open region for coordinate detection and image display. By covering the digitizer electrodes with the first frame, noise to the digitizer can be reduced. In the case of a rectangular shaped pattern, it is preferred that the rectangular pattern is transparent. The remaining configurations and connections between the digitizer and the digitizer drive circuit are the same as those of FIGS. 5A and 7, and thus their discussions need not be repeated.

Figure 9:
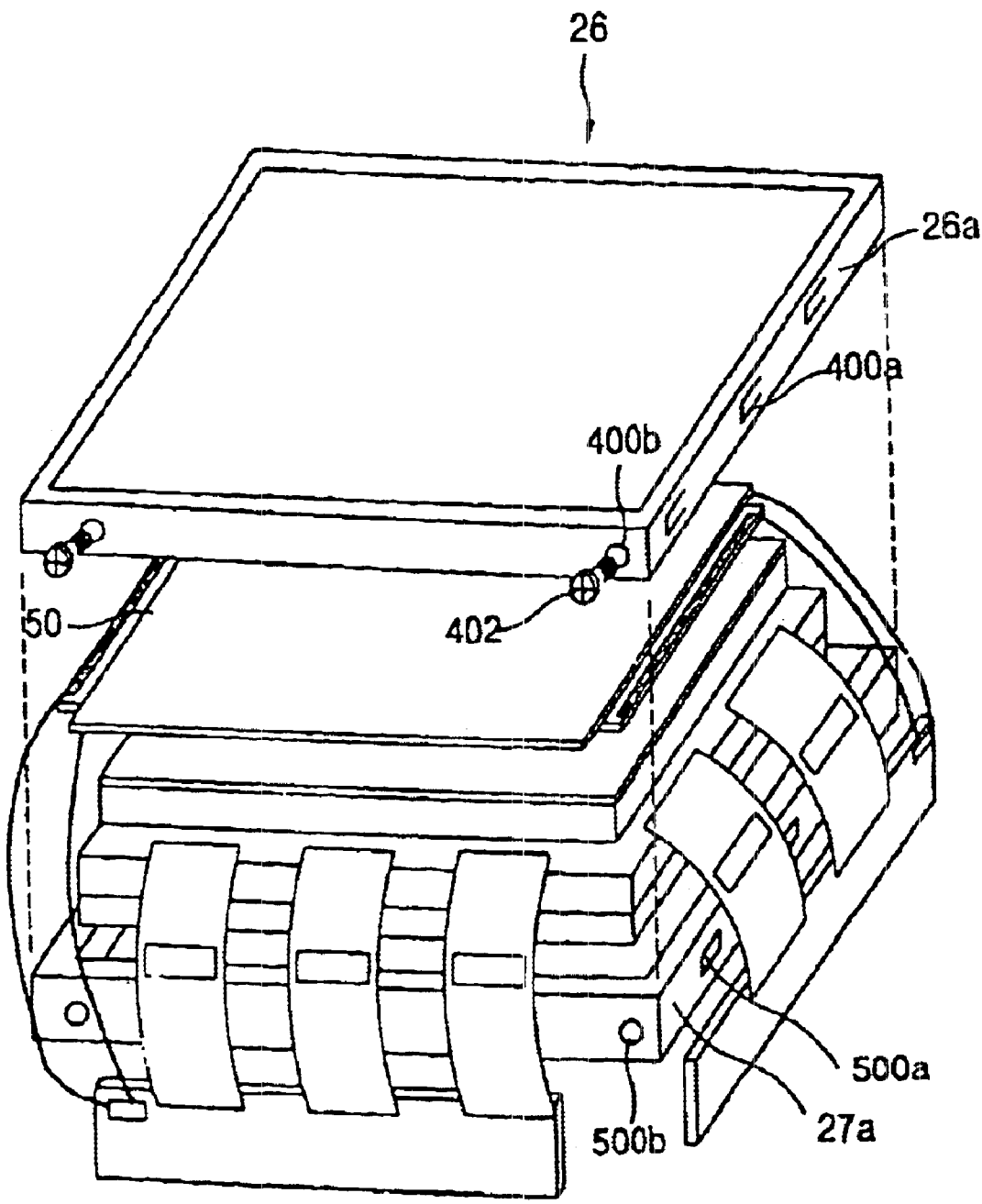
FIG. 9 is a perspective view illustrating a LCD device with a digitizer according o the preferred embodiments of the present invention.

FIG. 9 shows a method of holding the liquid crystal panel and a digitizer using first and second frames 26 and 27. As shown in FIG. 9, the first frame 26 has bendable portions 400a formed at its side wall 26a, and the second frame 27 has recess portions 500a formed at locations of its side wall 27a that correspond to the bendable portion 400a. Therefore, when the first frame 26 is pressed over the second frame 27 the bendable portions 400a of the first frame 26 are bent into the recess portion 500a of the second frame 27. Thus, the liquid crystal panel and the digitizer are held tightly by the first and second frames 26 and 27. Alternatively, instead of bendable and recess portions 400a and 500a, coupling members such as nails or screws could be used to hold the liquid crystal panel and the digitizer. In this case, it is preferred that the first frame 26 has through holes 400b and the second frame 27 has screw holes 500b. Therefore, when the first frame 26 is attached to the second frame 27 the screws 402 are tightened into the screw holes 500b through the through holes 400b. In any event, the liquid crystal panel and the digitizer are tightly held by the first and second frames 26 and 27.

Figure 10:
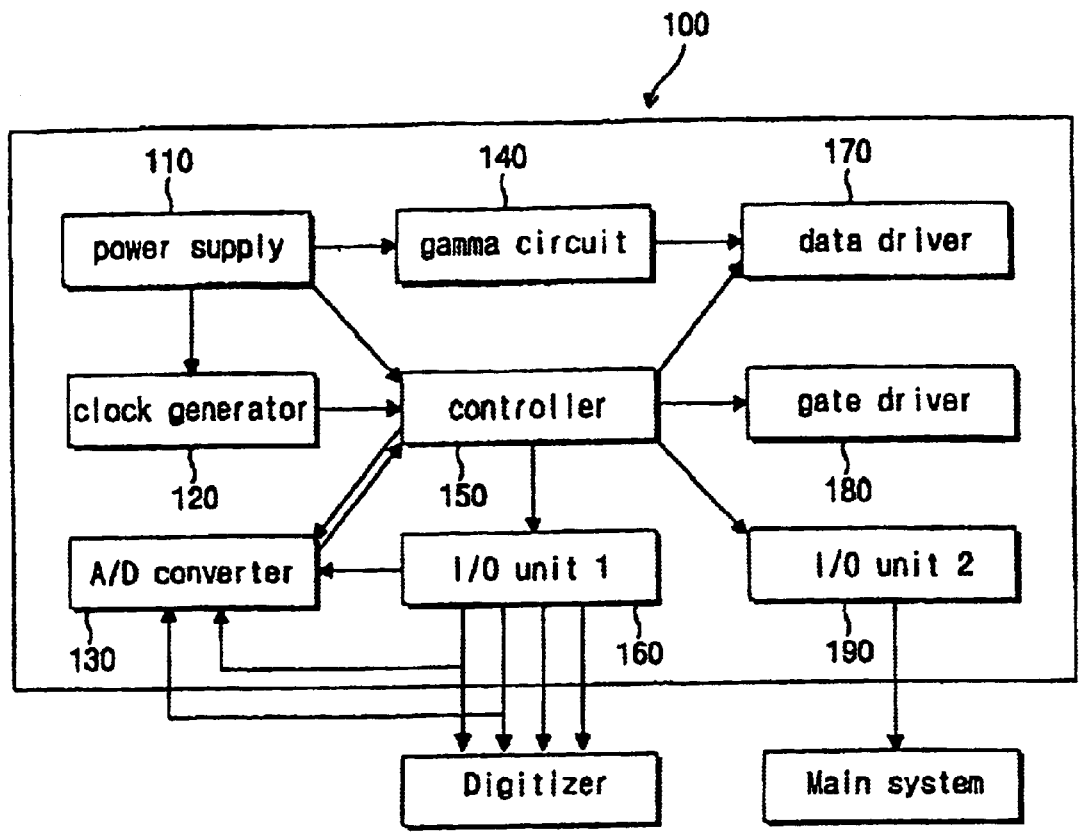
FIG. 10 is a block diagram of a drive circuit according to preferred embodiments of the present invention.

FIG. 10 is a block diagram illustrating the drive circuit according to the preferred embodiments of the present invention. The inventive drive circuit 100 drives both the LCD module "L" and the digitizer "D". The inventive drive circuit 100, as shown in FIG. 8, comprises a power supply 110 for supplying a voltage to all components of the LCD panel and the digitizer, a clock generator 120 for producing clock signals to drive the LCD device and the digitizer, an analog to digital (A/D) converter 130 for converting analog signals to digital signals, a gamma circuit 140 for correcting gamma characteristics of the LCD device, a controller 150 for controlling all components of the drive circuit 100, an input/output (I/O) unit 1 160 for conveying analog signals to the A/D converter 25f and conveying signals from the controller 25d to the digitizer, a data driver 170 for driving data lines, a gate driver 180 for driving a gate lines, and an input/output (I/O) unit 2 190 for transferring digital signals in the form of x and y coordinate values from the A/D converter 130 to a main system of the device having the LCD device such as a notebook computer by the controller 150. At this time, the I/O unit 1 160 can be one of a serial port, a parallel port, a universal serial bus (USB), and IEEE 1394 bus The digitizer "D" of the drive circuit 100 according to the preferred embodiment of the present invention is driven as follows. When voltage from the power supply 110 is applied to the digitizer electrodes of the digitizer through the controller 150 and the I/O unit 1 160, analog signals indicative of the location of a stylus or a finger are conveyed to the AID converter 130. Then, digital signals are transferred from the A/D converter 130 to the controller 150. The digital signals are also conveyed to the I/O unit 2 190 in the form of coordinate values from the controller 150, and finally that information is conveyed to the main system (such as a notebook computer).

Figure 11:
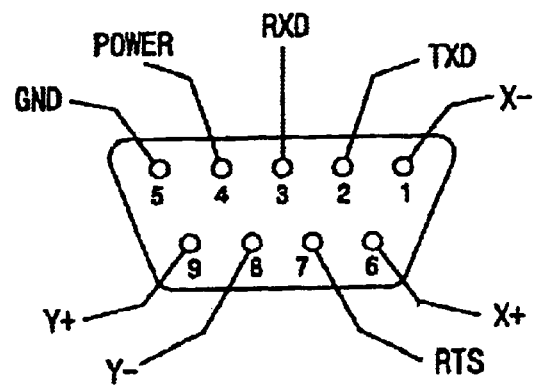
FIG. 11 is a front view of a connector of a digitizer according to an embodiment of the invention.

FIG. 11 shows a serial port suitable for use with the digitizer according to the preferred embodiment of the present invention. As shown in FIG. 11, the serial port comprises a pin 1 that transfers a x− signal, a pin 2 that transfers data, a pin 3 that receives data, a pin 4 that supplies a voltage, a pin 5 that connects with a ground, a pin 6 that transfers a x+ signal, a pin 7 that is a RTS signal, a pin 8 that transfers a y−signal and a pin 9 that transfers a y+ signal. In case the I/O unit 1 is the serial port, the serial port may be connected with the liquid crystal display device when the digitizer is used or not connected with the liquid crystal display device when the digitizer is not used.

As described above, using a LCD device having a digitizer according to the preferred embodiment of the present invention, the overall production cost is reduced and a compact liquid crystal display device can be achieved. Furthermore, display characteristics can be improved and power consumption can be reduced.

While the invention has been particularly shown and described with reference to preferred embodiments thereof, it will be understood by those skilled in the art that the foregoing and other changes in form and details may be made therein without departing from the spirit and scope of the invention. For example, the digitizers according to the preferred embodiment of the present invention can also be applied to infrared, acoustical, optical, capacitive, resistive and inductive type digitizers. Therefore, the scope of the invention shall be determined according to the appended claims and to their equivalents.

What is claimed is:

1. A liquid crystal display, comprising:
   a first frame;
   a liquid crystal panel supported by said first frame, said liquid crystal panel having a display region and a side portion;
   a digitizer on said liquid crystal panel, said digitizer having a peripheral portion and a plurality of digitizer electrodes;
   a second frame having a side wall and a front surface with an opening, said front surface pressing against said peripheral portion of said digitizer, said opening formed at a location corresponding to said display region of said liquid crystal panel;
   a printed circuit board having a drive circuit, said drive circuit driving said digitizer; and
   a plurality of electric connections for connecting said drive circuit to said corresponding digitizer electrodes, said electric connections having the same length,
   wherein said second frame and said first frame are secured together so as to hold said liquid crystal panel and said digitizer.

2. A liquid crystal display according to claim 1, wherein said electric connections pass between the side wall portion of the liquid crystal panel and the side wall portion of the second frame.

3. A liquid crystal display according to claim 2, wherein said plurality of digitizer electrodes are covered by said front surface.

4. A liquid crystal display according to claim 3, wherein said second frame is conductive.

5. A liquid crystal display according to claims 1, further comprising a controlling circuit on said printed circuit boards for controlling both said liquid crystal panel and said digitizer.

6. A liquid crystal display according to claim 1, wherein said printed circuit board are provided on a back surface of said first frame.

7. A liquid crystal display according to claim 1, wherein said drive circuit includes a power supply for supplying electrical power to said digitizer and to said liquid crystal panel.

8. A liquid crystal display according to claim 1, wherein said printed circuit board is mounted on said first frame.

9. A liquid crystal display according to claim 1, wherein said second frame and said first frame are secured together via screws.

10. A liquid crystal display according to claim 1, wherein said second frame and said first frame are secured together via bendable portions that mate with recesses.

11. A liquid crystal display according to claim 1, wherein said digitizer is a resistive digitizer.

12. A liquid crystal display according to claim 1, wherein said digitizer is a coupling capacitive type digitizer.

13. A liquid crystal display device, comprising:
    a digitizer having a plurality of digitizer electrodes for producing location signals indicative of a location of an external input on a digitizer pattern;
    a liquid crystal panel for displaying information according to signals produced by said digitizer;
    a printed circuit board having a drive circuit, said drive circuit driving said digitizer; and
    a plurality of electric connections for connecting said drive circuit to said corresponding digitizer electrodes, said electric connections having the same length,
    wherein said drive circuit includes a controller for controlling both said digitizer and said crystal panel according to a clock generator.

14. A liquid crystal display device according to claim 13, wherein said drive circuit further includes a power supply for supplying a voltage to said liquid crystal panel and to said digitizer.

15. A liquid crystal display device according to claim 13, wherein said digitizer produces analog signals, and wherein said drive circuit includes an analog to digital (A/D) converter for converting said analog signals to digital signals.

16. A liquid crystal display device according to claim 15, wherein said drive circuit further includes a first input/output (I/O) unit for conveying analog signals to said A/D converter and for conveying signals from said controller to said digitizer.

17. The liquid crystal display device of claim 16, wherein said first I/O unit is a serial port.

18. A liquid crystal display device according to claim 16, wherein said drive circuit further includes a second input/output (I/0) unit for transferring digital signals in the form of x-y coordinate values from said A/D converter to a main system.

19. A liquid crystal display device according to claim 13, said drive circuit further includes a gamma circuit for correcting gamma characteristics of said liquid crystal panel.

20. A liquid crystal display device according to claim 13, wherein said drive circuit further includes a data driver and a gate driver that are both driven by said clock generator.

21. A liquid crystal display device according to claim 13, further including a first frame and a second frame for securing said liquid crystal panel and said digitizer.

22. A liquid crystal display device according to claim 21, wherein said second frame includes a front surface pressing said digitizer toward said liquid crystal panel.

* * * * *